United States Patent [19]

Erler et al.

[11] Patent Number: 5,704,212

[45] Date of Patent: Jan. 6, 1998

[54] ACTIVE COOLING SYSTEM FOR CRADLE OF PORTABLE ELECTRONIC DEVICES

[75] Inventors: William F. Erler, Spokane, Wash.; Timothy P. O'Hagan, Akron, Ohio; Keith D. Grzelak, Spokane, Wash.

[73] Assignee: Itronix Corporation, Spokane, Wash.

[21] Appl. No.: 713,952

[22] Filed: Sep. 13, 1996

[51] Int. Cl.⁶ .............................. F25B 21/02; H05K 7/20; G06F 1/16
[52] U.S. Cl. .............................. 62/3.2; 62/3.7; 62/259.2; 364/708.1; 361/687
[58] Field of Search .................... 62/3.2, 3.7, 3.5, 62/3.6, 3.62, 259.2; 361/687–688, 704, 707, 711; 364/708.1

[56] References Cited

U.S. PATENT DOCUMENTS

| | | | |
|---|---|---|---|
| 3,481,393 | 12/1969 | Chu | 62/3.2 |
| 5,056,331 | 10/1991 | Lotz | 62/237 |
| 5,061,630 | 10/1991 | Knopf et al. | 435/290 |
| 5,287,244 | 2/1994 | Hileman et al. | 361/687 |
| 5,557,562 | 9/1996 | Yoshiharu et al. | 364/708.1 |
| 5,581,441 | 12/1996 | Porter | 361/701 |
| 5,615,085 | 3/1997 | Wakabayashi et al. | 361/702 |

OTHER PUBLICATIONS

IBM Technical Disclosure Bulletin "Mounting Bracket for a Mobile Computer" vol.37 No. 7, Jul. 1994.

*Primary Examiner*—William Doerrler
*Attorney, Agent, or Firm*—Wells, St. John, Roberts, Gregory & Matkin, P.S.

[57] ABSTRACT

An improved cradle assembly has a base with a mounting surface configured to removably receive a portable electronic device. The cradle assembly also has a cooler supported by the base to facilitate use of the portable electronic device in warm, or harsh, thermal environments. The cooler is positioned in thermally conductive relation with a portable electronic device that is received on the mounting surface. The cooler is operable to dissipate heat from the portable electronic device. In an alternative construction, a heat generator is substituted for the cooler to provide thermal heating of the portable electronic device in order to facilitate use of the device in cold, or harsh, thermal environments.

29 Claims, 10 Drawing Sheets

ACTIVE COOLING SYSTEM FOR CRADLE OF PORTABLE ELECTRONIC DEVICES

TECHNICAL FIELD

This invention relates generally to portable electronics equipment, and more particularly to cradle assemblies and methods for cooling portable electronic devices such as portable, laptop, notebook and pen computers that are removably supported in a cradle assembly.

BACKGROUND OF THE INVENTION

Portable electronic devices, such as notebook computers, dataform readers, barcode readers, portable data terminals, work slates, pen computers, and touch screen displays are typically used in environments where their portability is required. Therefore, they are typically equipped with a battery power supply. Because these devices are portable, they are frequently subjected to a harsh environment. High temperatures present a significant problem to the operation of microelectronic components contained within these devices. More particularly, thermal management of microprocessors has been implemented by microprocessor manufacturers, leading to control schemes that slow down, or even shut down microprocessor function when temperatures become too great.

The thermal management problem is increased even further when these devices are utilized inside service vehicles. Such devices typically need to be periodically connected with an external power supply in order to recharge the battery. In order to recharge the battery, service vehicles can be equipped with a cradle, or docking station that receives the device and recharges the battery via an external power supply. Otherwise, the battery has to be replaced periodically. However, the interiors of service vehicles can get extremely hot during summer months, especially when left unattended for long periods of time. When a service technician returns to the vehicle after making a service call, the interior of the vehicle can easily exceed 100° Fahrenheit. Under these conditions, the microelectronic components of the device will frequently slow down or shut down. However, the devices must be rendered usable under these conditions in order to perform maintenance and communications functions. Typically, these cradle assemblies include features that enable coupling of the device with peripheral components such as connectors for expansion ports and data buses and communication antennas, enabling an operator to receive and send service information between the vehicle computer and a home base station, or processing center.

Accordingly, commercial use of such portable electronic devices can subject the devices to severe thermal conditions. Particularly, where a cradle is provided within a service vehicle for mounting a computer therein, the inside of the vehicle can get extremely hot during summer months, preventing use of the computer within the vehicle where it is often needed. Therefore, a way and a device are needed to cool a portable electronic device when operating the device in a harsh thermal environment. Particularly such improvements are needed to facilitate use with service personnel who must frequently operate and/or store the device on a vehicle-based cradle within a hot interior of a service vehicle when making a large number of customer service calls. Alternatively, use of a portable electronic device in an extremely cold environment can slow down or stop operation of the device, particularly as a result of the effects of cold weather on the operation of the battery power supply. Therefore, similar improvements are needed to heat a portable electronic device when operating a device in a harsh and extremely cold thermal environment.

The present invention relates to an improved cradle, or docking station and method that exchanges heat between a portable electronic device and a cradle, when the device is received on the cradle.

BRIEF DESCRIPTION OF THE DRAWINGS

Preferred embodiments of the invention are described below with reference to the following accompanying drawings.

FIG. 8 is a side elevational view of the notebook computer and cradle assembly corresponding to FIG. 7, but taken later in time showing the notebook computer mated with the cradle assembly;

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

According to one aspect, this invention comprises an improved cradle assembly having a base and a cooler supported by the base. The base has a mounting surface configured to removably receive a portable electronic device. The cooler is positioned in thermally conductive relation with a portable electronic device that is received on the mounting surface. In this configuration, the cooler is operable to dissipate heat from the portable electronic device.

According to another aspect, this invention comprises an improved cradle assembly having a base and a heat rejector. The base has a mounting surface configured to removably receive a portable electronic device. The heat rejector is supported by the base in thermally conductive relation with the portable electronic device when received on the mounting surface, the heat rejector being operable to dissipate heat from the portable electronic device.

According to yet another aspect, this invention comprises a computer docking station having a cradle and a heat transfer device. The cradle is configured to receive the computer. The heat transfer device is carried by the cradle and is configured in thermally conductive relation with a heat conducting portion of the computer, the heat transfer device being operable to transfer heat between the computer, when received on the cradle, and the heat transfer device.

Figure 1:
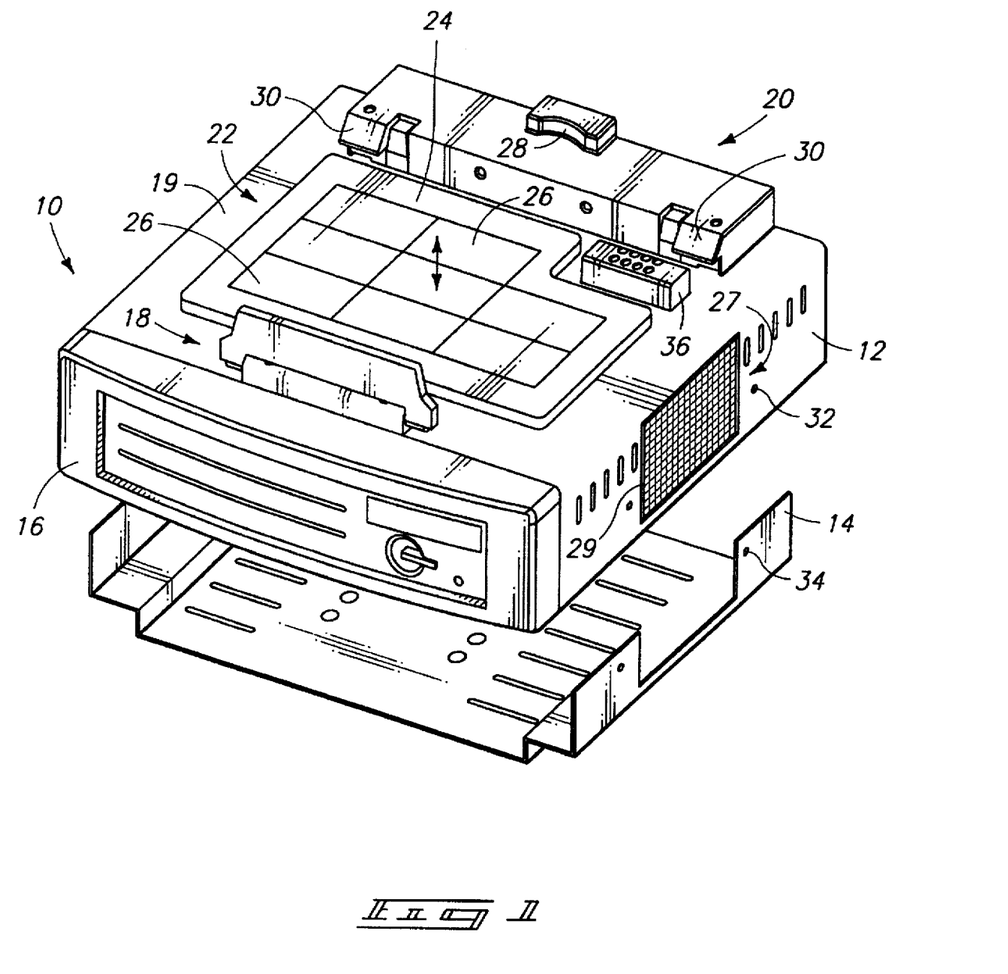
FIG. 1 is a perspective view of a cradle assembly for receiving a portable electronic device in the form of a notebook computer having features embodying this invention for cooling the computer.

These and other aspects of the invention are described in more detail with reference to FIGS. 1–9. The present invention provides a cradle assembly for supporting a portable electronic device. Referring in more detail to the drawings, FIG. 1 illustrates a cradle, or docking station 10 configured to releasably support a portable electronic device, such as a notebook computer 76 (see FIG. 6). Cradle 10 comprises a base 12 formed in the shape of a housing for housing associated peripheral components including power supplies, data communications buses, disk drives, and other memory devices. Base 12 serves as a support platform for the computer. Cradle 10 also comprises a u-shaped mounting bracket 14 formed from a single piece of folded sheet metal and configured to removably mount base 12 to a table or support structure (not shown). In one application, bracket 14 is secured to a support platform within a service vehicle. A bezel 16 forms the front of base 12 where controls and removable data storage devices such as floppy disks can be easily accessed by a user.

To facilitate mounting of a portable electronic device onto cradle 10, a dovetail assembly 18 is pivotally supported on a top face 19 of base 12, along a forward portion. Top face 19 forms, at least in part, a mounting surface on base 12. Assembly 18 forms a first mating member for engaging with a complementary mating member on an electronic device. Additionally, a latch assembly 20 is movably carried on face 19, along a rear portion of base 12 to enable releasable mounting of the device on cradle 10. Assembly 20 forms a second mating member for engaging with another complementary mating member on an electronic device. Assembly 20 is biased into a loading position when the device is lowered to facilitate engagement with mounting features of the device to be mounted thereon.

According to the construction of FIG. 1, a portable electronic device (not shown) having complementary mating features is releasably retained on cradle 10 by assemblies 18 and 20. When retained, a retractable cooler assembly 22 engages in thermally conductive relation with a bottom face of a portable electronic device. Cooler assembly 22 has a spring biased retractable tray 24 configured to house and protect one or more thermal coolers 26 therein. In one version, tray 24 is constructed from a single piece of stamped metal, or sheet metal, having a recess for receiving coolers 26 in substantially flush relation with the top face. Coolers 26 are preferably thermoelectric coolers placed in adjacent side-by-side relation. Alternatively, a single cooler 26 can be used (see FIG. 2).

Additionally, assembly 22 cooperates with an electric motor driven fan 27 (see FIG. 2) to form a thermal cooler, or heat rejector that rejects heat from a hot side of cooler 26. When a portable electronic device is retained on cradle 10, the spring biased feature of cooler assembly 22 presents coolers 26 in conformable thermal abutment with a bottom surface of the electronic device. In this abutting relationship, heat is rejected from the bottom surface of the device via cooler 26, enabling operation of the device in thermally elevated environments. Preferably, at least a portion of the bottom of the electronic device is formed from a thermally conductive material, such as metal or conductive composite. This portion is positioned to thermally couple, or contact coolers 26 when loaded onto cradle 10.

Details of dovetail assembly 18 and latch assembly 20 of FIG. 1 are disclosed in our U.S. patent application Ser. No. 08/670,723 filed on Jun. 21, 1996 and entitled, "Cradle Assembly for Portable Computing Devices and Method", listing inventors as Jay Clark, Jonathan LaMarche, and Robert J. Tuttle Sr. This 08/670,723 application, is hereby incorporated by reference. Assemblies 18 and 20 cooperate with complementary mating features on the portable electronic device to removably mount the device onto cradle 10. Assembly 18 is rotatably attached to cradle 10, and is initially loaded into engagement with a leading edge of the computer. Subsequently, assembly 20 engages with the opposite rear edge of the computer by rotating the device about assembly 18 causing fingers 30 to move away from assembly 18 to trap the computer between assemblies 18 and 20 in a vertically lowered position. Such construction enables single handed loading by an operator, and accommodates the spring biased vertical motion of tray 24 and coolers 26 as the computer is loaded onto cradle 10. The loaded configuration is depicted and described below with reference to FIG. 6.

Latch assembly 20 of FIG. 1 includes a trigger 28 positioned to enable user biasing of a pair of laterally spaced apart fingers 30 in a direction away from assembly 18. Assembly 20 is retained in a normal resting state by one or more internal springs, requiring a user to overcome the spring force when biasing fingers 30 away (outwardly) from assembly 18 during mating and demating of a device. Translational movement of fingers 30 away from assembly 18 is required when mating and demating a device with cradle 10. Alternatively, rotational or other kinematic movement can be used to engage and disengage fingers 30 from a received device. Trigger 28 is finger manipulated by a user, pulling fingers 30 away from assembly 18 in order to demate a device from cradle 10. Fingers 30 on assembly 20 each have a sloped, or bevelled surface to facilitate outward movement of fingers 30 when a device is urged downwardly into contact with the sloped surfaces and onto cradle 10 during loading. When trigger 28 is released, spring biasing of assembly 20 presents fingers 30 in their normal resting state, closer in proximity to dovetail assembly 18, but restrained by translation-limiting features, or stops. Assembly 20 includes translation limiting features that present fingers 30 in a desired spaced apart position from assembly 18 to facilitate mounting of a device to cradle 10 without requiring that a user manipulate trigger 28.

To facilitate servicing of cradle 10, base 12 of FIG. 1 is removably mounted to u-shaped bracket 14 with a plurality of threaded fasteners (not shown). In this manner, base 12 can be removed from its service location to simplify maintenance and repair, for example, from the interior of a service vehicle. Bracket 14 is permanently mounted to a support structure, while base 12 is removably mounted to bracket 14. Apertures 32 in base 12 and apertures 34 in bracket 14 align to receive a fastener through each pair of apertures, respectively. In this manner, bracket 14 can be permanently mounted to the support structure, for example, to a work table within the service vehicle, while base 12 can be more easily removed to enable periodic maintenance and repair.

Cooler 26 of cooler assembly 22 is preferably constructed from a Peltier effect thermoelectric cooler. Pursuant to the Peltier effect, heat is evolved or absorbed at the junction of two dissimilar metals while carrying a small current. Heat is evolved or absorbed depending upon the direction of the applied current. One suitable cooler is presently sold by Melcor Corporation, 1040 Spruce Street, Trenton, N.J. 08648 under the model number CPO.8-0254-052. This device is a thermoelectric cooler (TEC) configured in the form of a solid state heat pump. The device has a total of 254 P/N pairs. Cooler 26 utilizes the Peltier effect to create a cold (or cool) top surface and a hot (or warm) bottom surface. During operation, DC current flows through the TEC, causing heat to be transferred from the top side of the cooler to the bottom side. A single stage TEC cooler can realize temperature differences of up to 70° C., or can transfer heat at a rate of 34 Watts.

Alternatively, to achieve even greater temperature difference (even up to 131° C.), a multistage or cascaded TEC cooler can be used. Additionally, TEC coolers can be mounted side-by-side (as shown in FIG. 1) in order to cover a larger surface area on tray 24. According to the version depicted in FIG. 1, eight TEC coolers 26 are shown mounted together in side-by-side relation within tray 24.

Alternatively, cooler 26 of FIG. 1 can be mounted with the warm surface on the top and the cool surface on the bottom. One way to do this is to reverse the flow of current to cooler 26. Another way is to mount cooler 26 upside down. Such a configuration would produce a heat generator that provides heating to a portable electronic device when utilizing the device in an extremely cold, or harsh environment. For example, use of portable electronic devices during the winter can cause slowdown in device operating speeds, particularly as a result of the cold weather effects on a battery and/or internal electronics. Therefore, application of heat via the implementation of this invention will warm internal components of the portable electronic device, enabling its use in a cold environment.

A cooler configuration according to FIG. 1 is positioned on the upper surface of the vehicle cradle by mounting coolers 26 within tray 24 and directly beneath the location on a portable electronic device where heat is most desirably removed. For example, where the portable electronic device is a notebook computer having a thermally conductive case, cooler 26 is preferably mounted within tray 24 directly beneath the bottom of the computer case. Ideally, coolers 26 are located in tray 24 in a location which contacts the computer case directly beneath a location requiring removal of heat. In one case, a single cooler 26 can be located to remove heat from a microprocessor of the computer. In another case, cooler 26 can be located to remove heat from the case of the computer in a location where a heat pipe is attached between the case and the microprocessor. A heat pipe is typically formed from an elongate piece of thermally conductive material. A proximal end of the heat pipe is attached to a microelectronic component, such as a microprocessor, and a distal end is attached to a metal object of the computer case, such as a keyboard tray. However, in this case, the distal end of the heat pipe could be extended to the bottom surface of the computer where it contacts cooler 26.

Optionally, any of a large number of cooling/heating devices can be substituted for cooler assembly 22 on cradle 10 including: cryogenic coolers; refrigeration devices having radiators and/or fluid cooling jackets; air flow cooling devices (i.e., fans) that produce air flow which rejects heat from the portable electronic device; various heaters and a finned surface provided on the underside of tray 24. For the later case, introduction of cooling air via fan 27 will transfer heat from the top surface of tray 24 through the fins and into the cooling air.

Figure 2:
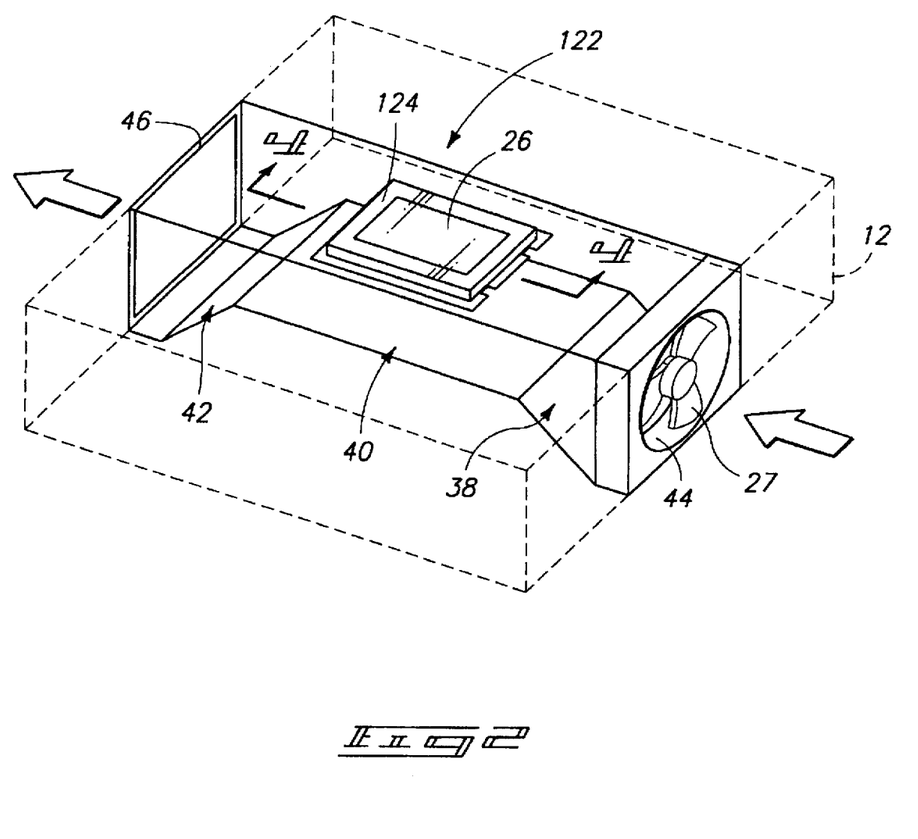
FIG. 2 is a perspective view of the cooling system provided in the cradle assembly of FIG. 1, but having an alternatively configured cooler assembly with a single cooler and illustrating the cradle housing in phantom to facilitate viewing.
Figure 4:
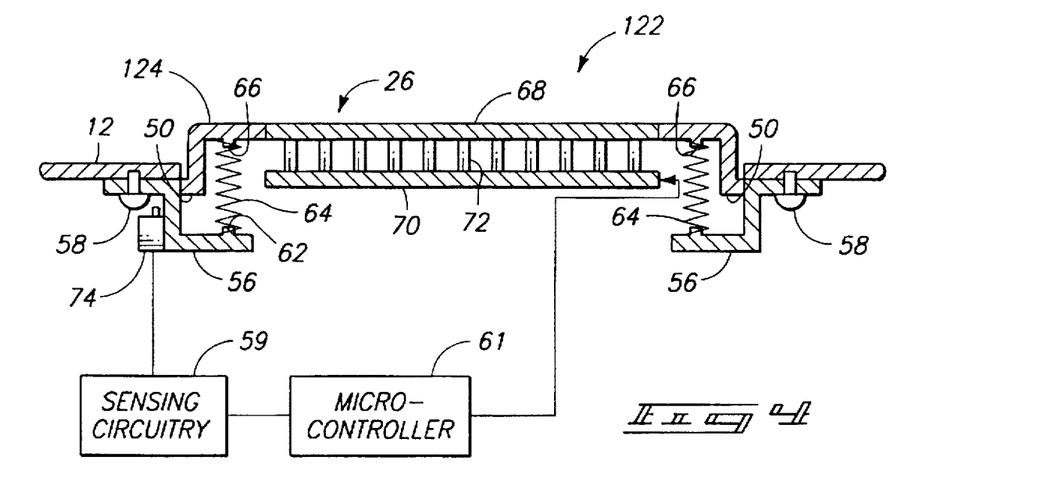
FIG. 4 is a vertical sectional view taken generally along line 4—4 of FIG. 2 depicting the surface conformable cooling assembly in a fully raised orientation prior to receiving a portable electronic device atop the cradle.

FIG. 2 illustrates the cooling system, or thermal cooler provided in cradle 10 of FIG. 1, but having an alternatively configured cooler assembly 124 with a single cooler 26 and illustrating the cradle housing in phantom to facilitate viewing of the motor driven fan 27. Fan 27 removes heat from the bottom, or warm side of cooler 26 during operation of cooler 26. Cooler 26 is operated by applying DC current to cooler 26 via a dedicated power supply for cradle 10. According to one implementation, cooler 26 is supplied with operating power in response to detection of a loaded device being received atop cradle 10. FIG. 4 depicts one device, a position sensor 74, suitable for detecting the presence of a loaded device being received atop cradle 10. Sensor 74 produces signals that are discriminated by sensing circuitry 59 via a microcontroller 61 (see FIG. 4).

To enhance the flow velocity of cooling air, or fluid being received within cradle 10, air is received into an interior cavity of cradle 10 where it is pulled into a duct work system having a reduced flow cross sectional area beneath cooler assembly 124. The reduction in flow cross sectional area beneath cooler assembly 124 increases the flow speed of air along the bottom side of cooler 26, greatly increasing the removal of heat therefrom. Fan 27 pulls air into the cradle duct work (past screen 29 of FIG. 1) via inlet port 44. The inlet air is then compressed and accelerated in a converging inlet duct 38. The accelerated air passes along the underside of cooler 26 through a constant diameter restricted throat duct 40. Next, the air is decelerated in a diverging outlet duct 42. Finally, the cooling air leaves outlet duct 42 and cradle 12 via an outlet port 46.

Figure 3:
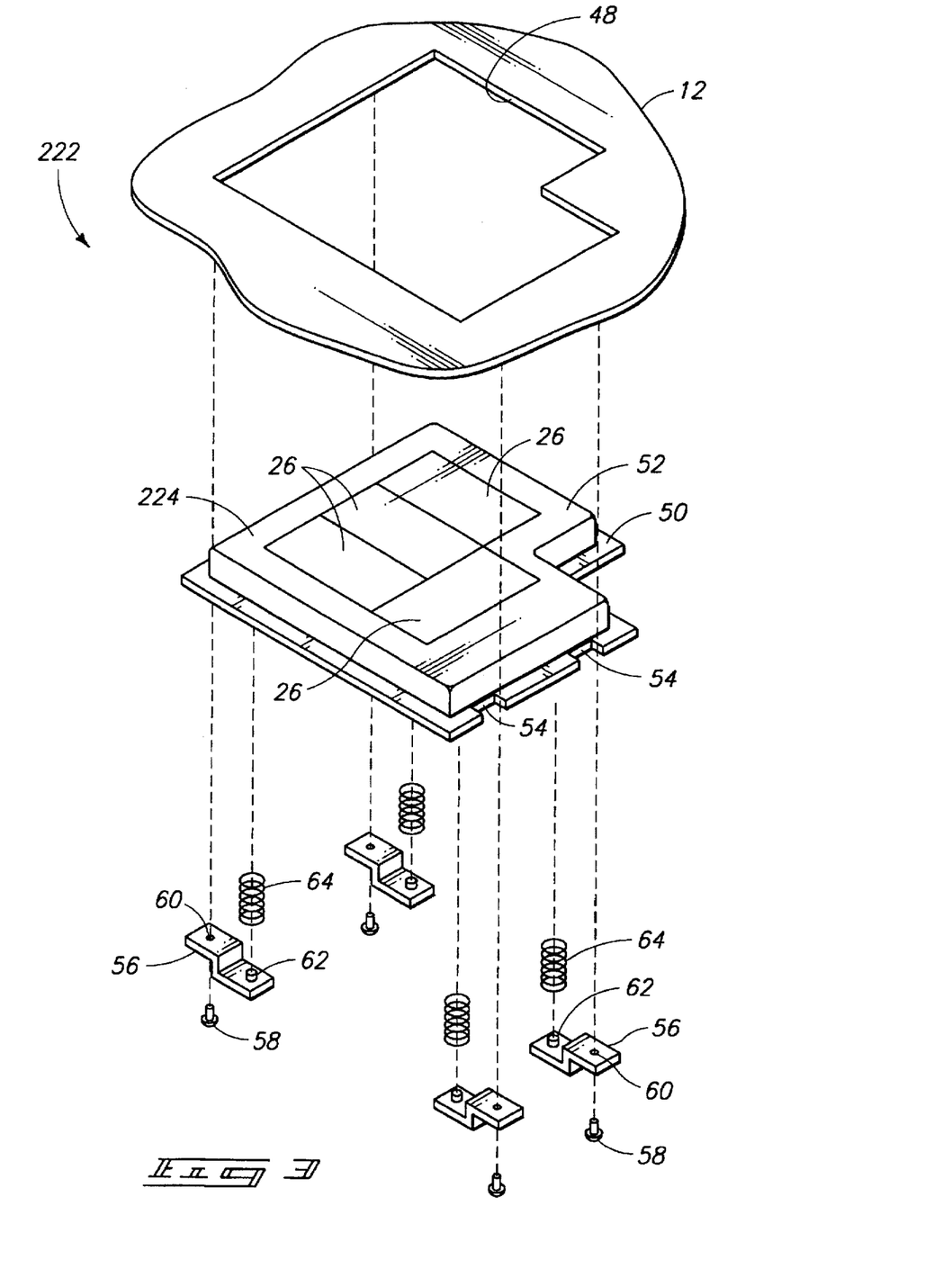
FIG. 3 is an enlarged exploded perspective view illustrating construction of the cooling system provided in the cradle assembly of FIG. 1, but having another alternatively configured cooler assembly with four coolers and illustrating the spring biased surface conformable cooling assembly within a top surface of the cradle housing.

FIG. 3 depicts the spring biased construction of cooler assembly 222 in a third embodiment configuration. The spring biased construction for the embodiments depicted in FIGS. 1 and 2 is virtually identical, with the exception being the number and layout of coolers 26 being different. Cooler assembly 222 has four coolers 26 arrayed in side-by-side relation within an aperture of a support tray 224. Each cooler receives a supply of DC current to power the device. Tray 224 is carried within aperture 48 of base 12 in vertically movable relation. A retaining flange 50 is formed along an outer periphery of tray 224, and serves to limit the vertically raised topmost position of tray 224 within aperture 48. Flange 50 is sized slightly larger than aperture 48, creating an abutment surface that limits motion of tray 224 within aperture 48. A plurality of slots 54 allow clearance room for corresponding retaining brackets 56 that limit the bottommost position of tray 224 within aperture 48. Additionally, brackets 56 receive a threaded fastener 58 through an aperture 60 and into a complementarily threaded bore (not shown) within the bottom of base 12. A stud 62 on each bracket 56 serves to retain and entrap a spring 64 in compression between each bracket 56 and the bottom of base 12. A second set of studs 66 (see FIG. 4) is provided on the underside of base 12 to further retain and entrap each spring 64. The compressed springs 64 bias tray 224 and coolers 26 into a topmost position, such that when a portable electronic device is received on cradle 10, coolers 26 will be pressed into mating, or conforming contact with the bottom of the device, as springs 64 compress slightly under the load of the device. The plurality of threaded fasteners 58 enable assembly of tray 224 and coolers 26 in spring biased relation within aperture 48 of base 12; namely, within a top surface of the cradle housing.

Preferably, coolers 26 are adhesively retained within a receiving aperture of tray 224. Similarly, coolers 26 are adhesively retained within the receiving aperture of trays 24 (see FIG. 1) and 124 (see FIG. 2). Alternatively, coolers 26 can be press fit into tray 224. Even further alternatively, coolers 26 can be welded or soldered into place. Yet another technique involves the use of fasteners to retain coolers 26 in flush relation with the top surface of tray 224.

FIG. 4 illustrates cooler assembly 122 of FIG. 2 in a vertical cross sectional view taken generally along line 4—4 of FIG. 2. Cooler assembly 122 is depicted in a normal unloaded, or resting state with tray 124 being spring biased in a fully raised orientation. Tray 124 and cooler 26 are presented in an elevated position prior to receiving a portable electronic device atop cradle base 12. Base 12 is virtually identical with base 12 (of FIG. 1), except for a difference in the shape of the aperture for receiving tray 124. The motion limiting features provided by the coaction of flange 50 with the bottom of base 12 (when fully raised) and the top of bracket 56 (when fully lowered) can be readily seen.

The use of removable brackets 56 facilitates the assembly of cooler assembly 122. Tray 124 is first assembled by securing cooler 26 in flush relation with the top face. Then a spring 66 is received on a stud 66 at each of four corner locations on the underside of tray 124. Next, a bracket 56 is fitted under each spring such that a stud 62 traps the other end of the associated spring 64. A threaded fastener 58 then secures each bracket 56 securely to the bottom side of base 12.

According to the construction of FIG. 4, cooler 26 is formed from a Peltlet effect thermoelectric cooler made by Melcor Corporation, 1040 Spruce Street, Trenton, N.J. 08648 under the model number CPO.8-0254-052. Such device has a metallized top face 68 with a 50 mm length and a 25 mm width. Similarly, a metallized bottom face 70 has the same dimensions. The thickness from the top of face 68 to the bottom of face 70 is 5.1 mm. Only the top face 68 is mounted within the receiving recess of tray 124 where it is adhesively bonded, supporting the entire cooler 26.

Figure 5:
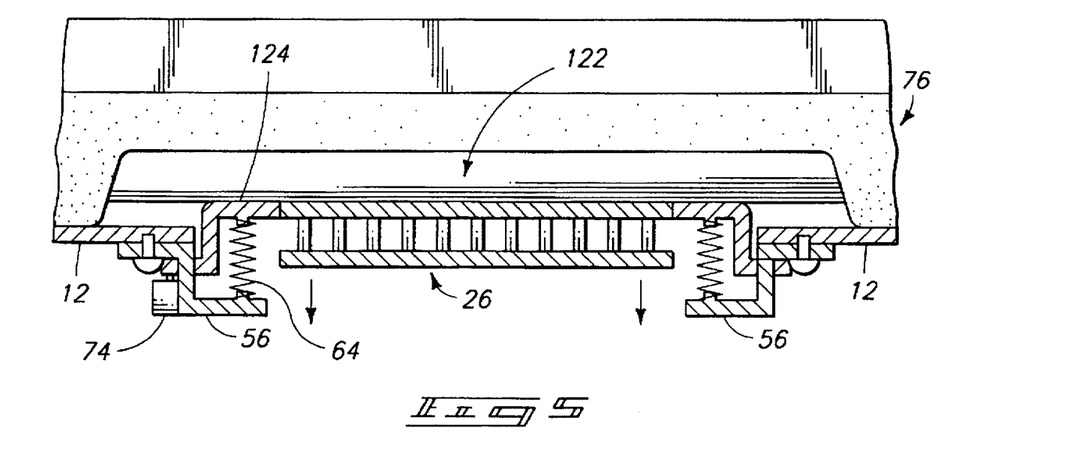
FIG. 5 is a vertical sectional view taken in the same location as FIG. 4 and depicting the surface conformable cooling assembly in a depressed orientation after receiving a portable electronic device atop the cradle.

A position sensor 74 such as a contact switch is carried by one of the brackets 56 for detecting the loading of a device onto cooler assembly 122. As shown in FIG. 4, sensor 74 is separated from flange 50, causing detection of an unloaded condition. FIG. 5 illustrates sensor 74 in a loaded, or contact condition. Alternatively, an eddy-current non-contacting transducer, a variable inductance pickup device, a linear-variable-differential-transformer (LVDT) displacement pickup, a cantilever beam with a strain gage, a capacitive device, a piezoelectric device, an electro-optical device, or any other device suitable for measuring displacement of tray 124 relative to base 12 can be used.

As shown in FIG. 4, sensor 74 produces signals that are discriminated by sensing circuitry 59 via control through a microcontroller 61. Additionally, microcontroller 61 enables/disables operation of cooler 26 by supplying/removing electrical current to cooler 26. Additionally, or alternatively, a microprocessor and memory can be configured to detect, discriminate and control operation of cooler 26. Even further, a temperature sensor (not shown) can be added to cooler assembly 122 to provide an input to microcontroller 61 for enabling/disabling operation of cooler 26 when a hot/cold condition is detected adjacent to the top face of cooler 26. According to one construction, thermal detection above a threshold temperature would enable operation of cooler 26, with thermal detection below the temperature disabling operation. According to another construction, thermal detection below a threshold temperature would enable operation of cooler 26, with thermal detection above the temperature disabling operation. The later construction could be used for the case where cooler 26 is mounted upside down and is configured to heat a portable electronic device carried on top.

FIG. 5 illustrates cooler assembly 122 with a notebook computer being received atop base 12, causing downward displacement of tray 124. Springs 64 are each independently compressed, which allows tray 124 and cooler 26 to engage in mating parallel, or conforming contact with the bottom of computer 76. Preferably, the bottom of computer 76 is formed from metal such as magnesium, or some other thermally conductive material. Hence, cooler 26 removes heat from the bottom of the computer, reducing heat buildup within the computer, and enabling thermal management of microelectronic components contained within the computer. Switch 74 is positioned to detect the loaded status of computer 76 atop cooler 26. Preferably, a system controller 61 (of FIG. 4) within the cradle implements control logic that turns on cooler 26 when sensor 74 detects a loaded displacement condition. Likewise, the system controller turns off cooler 26 when sensor 74 does not detect a loaded displacement condition.

Figure 6:
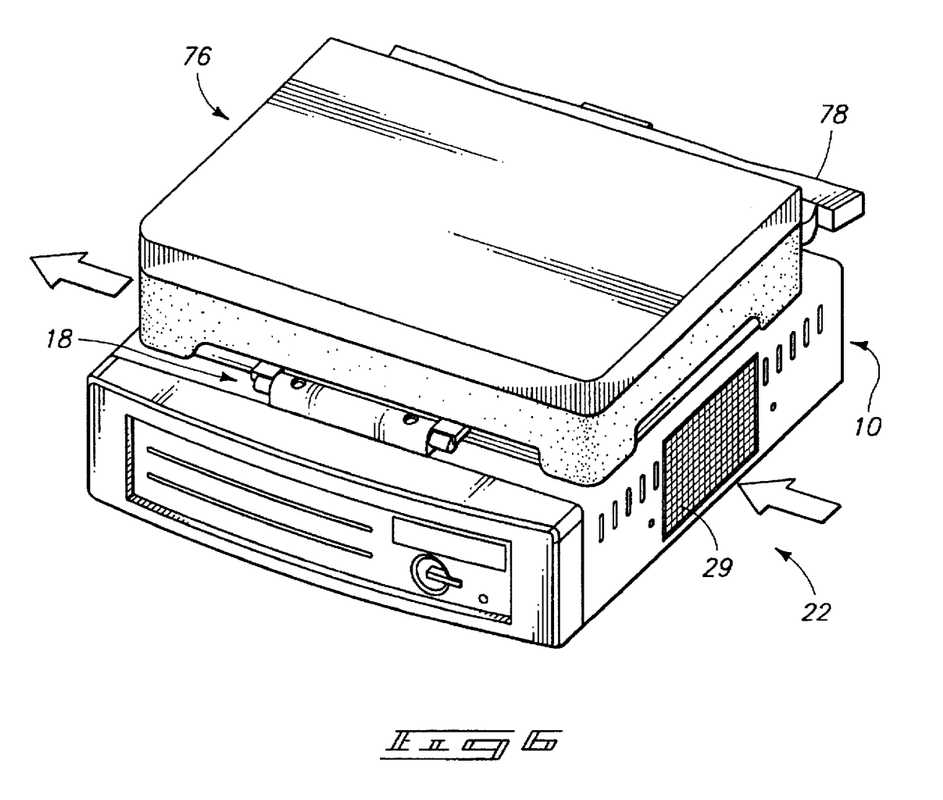
FIG. 6 is a perspective view of a cradle assembly corresponding to the embodiment depicted in FIG. 1 while supporting a notebook computer having features embodying this invention for cooling the computer.

FIG. 6 illustrates cradle 10 in use with a notebook computer 76 serving as one exemplary portable electronic device. However, various alternative electronic devices, many having central processing units, include pen computers, data forms readers, meter readers, laptop computers, portable computers, electronic test instruments, and various other devices requiring an external power supply to supplement battery power can be configured for use with cradle 10, simply by providing complementary mating features for engagement with the mating features of device 10. However, the presence of a processor in the portable electronic device is not necessary. Hence, the cooling features of this invention can be applied to cool a variety of portable electronic devices when mating the devices to a cradle of this invention. Even further, the fluid cooling features of this invention also serve to reject heat from the portable electronic device by drawing cooling air through screen 29 into cradle 10 where it removes heat from the top of the cradle. Yet even further, these portable electronic devices can be heated by the features of this invention.

Figure 7:
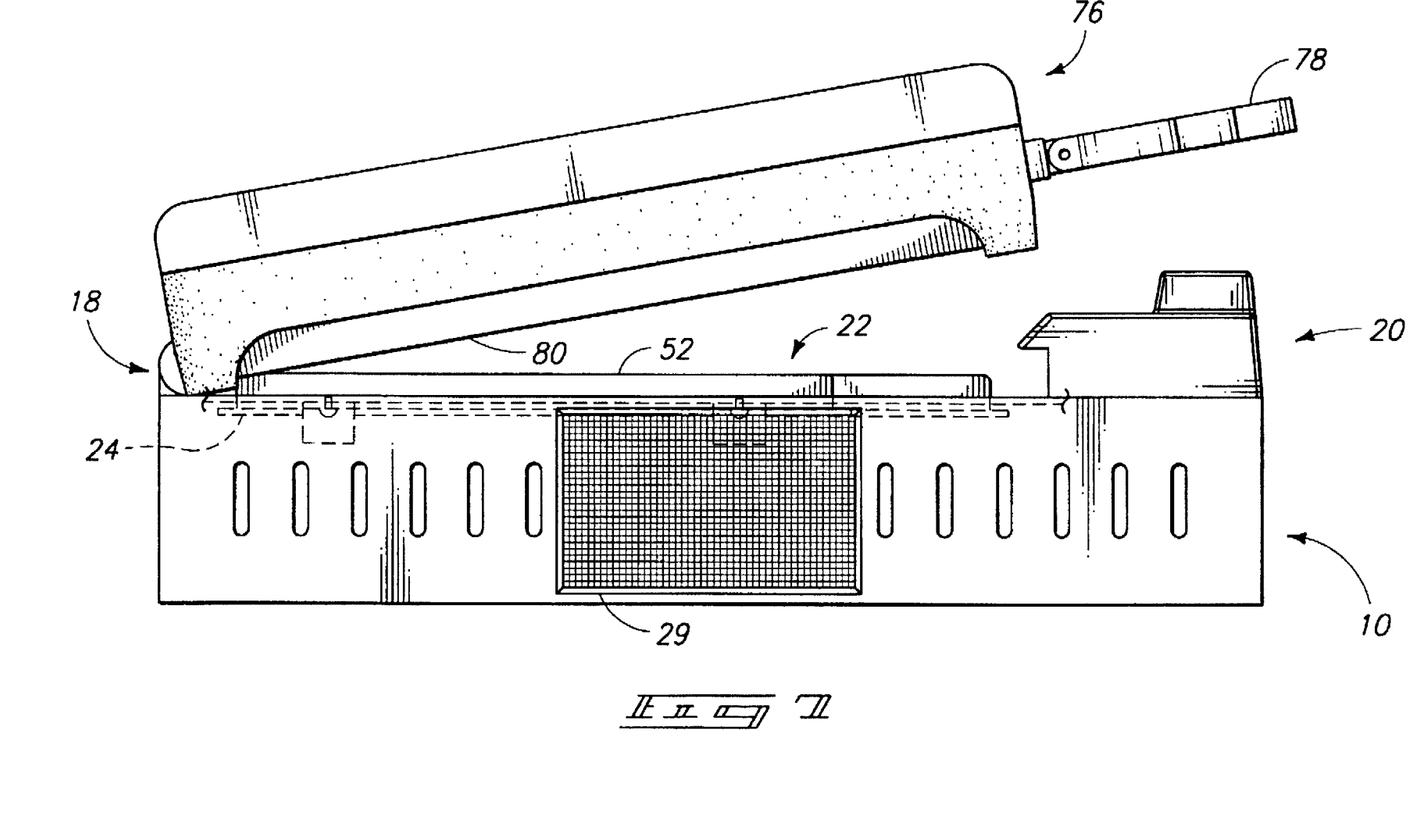
FIG. 7 is a side elevational view of a notebook computer as it is being positioned to mate with the cradle assembly of FIGS. 1 and 6.

FIG. 7 illustrates computer 76 and cradle 10 during mounting of computer 76 to cradle 10. Computer 76 has been mated with dovetail assembly 18, causing mating engagement at the forward end. From this position, computer 76 is then pivoted about assembly 18, causing engagement (or slamming) of fingers 30 with recesses provided in computer 76. By urging heels on computer 76 against faces on fingers 30, fingers 30 and accompanying portions of latch assembly 22 are displaced away from assembly 18, causing fingers 30 to retract and enabling lowering of computer 76 onto the top face of cradle 10. As computer 76 is pivoted, connector assembly 22 is depressed, causing it to lower in engagement with the bottom of the computer. At the same time cooler assembly 22 (and connector 36 of FIG. 1) retract, while remaining in spring-biased engagement with a bottom face of computer 76. A handle 78 further facilitates single-handed loading/unloading of computer 78 onto cradle 10.

FIG. 8 illustrates computer 76 in a lowered, or loaded position atop cradle 10. Cooler assembly 22 has been downwardly depressed, causing a raised topmost face 52 to contact the bottom surface 80 of computer 78. Hence, coolers within cooler assembly 22 are spring biased into thermally conductive engagement with the thermally conductive bottom surface 80 of computer 78.

Figure 9:
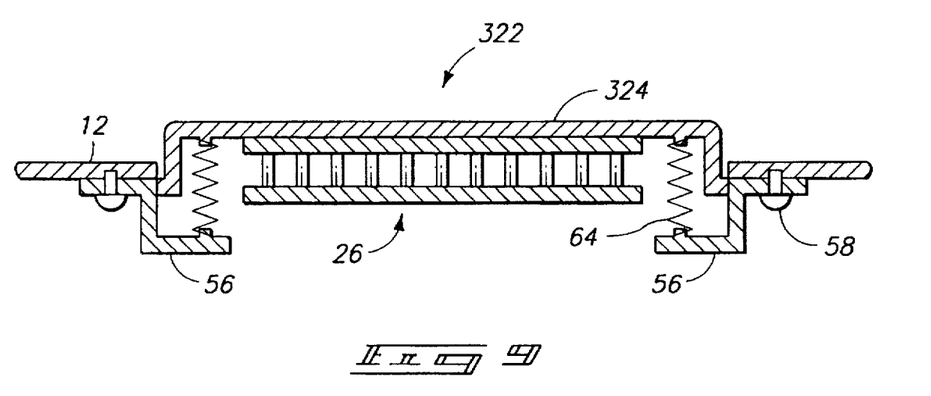
FIG. 9 is a vertical sectional view of another alternatively constructed cooler assembly taken in the same location as FIG. 4 and depicting a cooler carried beneath a protective metal tray.

FIG. 9 depicts another alternatively constructed cooler assembly 322 in vertical cross sectional view, taken in the same location as FIG. 4. Cooler assembly 322 has a cooler 26 carried beneath a thermally conductive tray 324. By placing cooler 26 beneath tray 324, the top surface of cooler 26 is protected from contact abrasion and wear with the bottom surface of a device being loaded on top. Preferably, tray 324 is formed from a thin piece of sheet metal, and cooler 26 is adhesively glued, bonded, welded or brazed to the bottom surface of tray 324.

Figure 10:
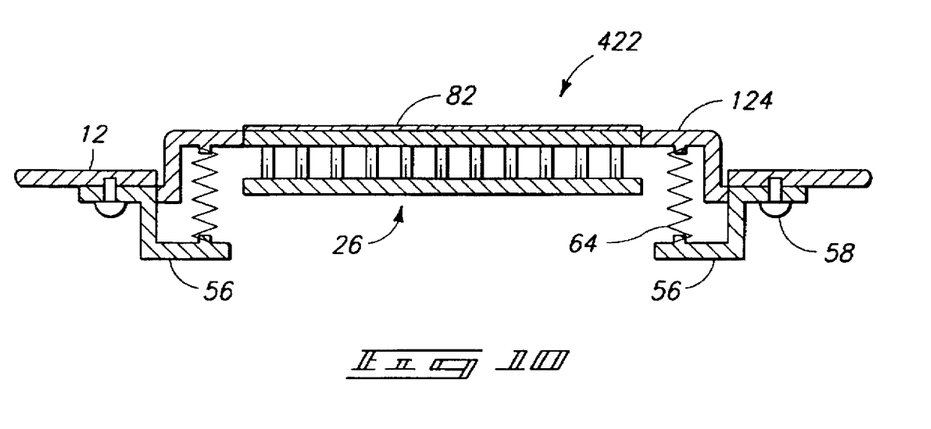
FIG. 10 is a vertical sectional view of yet another alternatively constructed cooler assembly taken in the same location as FIG. 4 and depicting a cooler carried within a protective metal tray, similar to that depicted in FIG. 4, but with the addition of a thermally conductive protective pad placed atop the cooler.

FIG. 10 depicts yet another alternatively constructed cooler assembly 422 in vertical cross sectional view, taken in the same location as FIG. 4. Cooler assembly 422 has a cooler 26 carried in an aperture of tray 324. However, a protective layer of thermally conductive material has been applied over cooler 26 to protect the topmost surface from contact abrasion and wear with the bottom surface of a device being loaded on top. One type of thermally conductive material is a thermally conductive polymeric material, such a T-pli Series 200, sold by Thermagon, Inc., 3256 West 25th Street, Cleveland, Ohio. T-pli is a thermally conductive, conformable, dielectric elastomeric material. T-pli has a very high thermal conductivity of 8 Watts/m° C. Additionally, it has conformability, and together these features allow it to dissipate heat efficiently, even at thicknesses of 10–200 ml. T-pli can be used to help compensate for dimensional differences between mating parts, filling the voids and air gaps, and serving to absorb shock. Hence, such a material forms a heat-conducting interface between a solid heat generating component and a heat dissipating element or sink. Alternatively, a protective layer of any other thermally conductive material, such as a thin piece of sheet metal, can be utilized.

Figure 11:
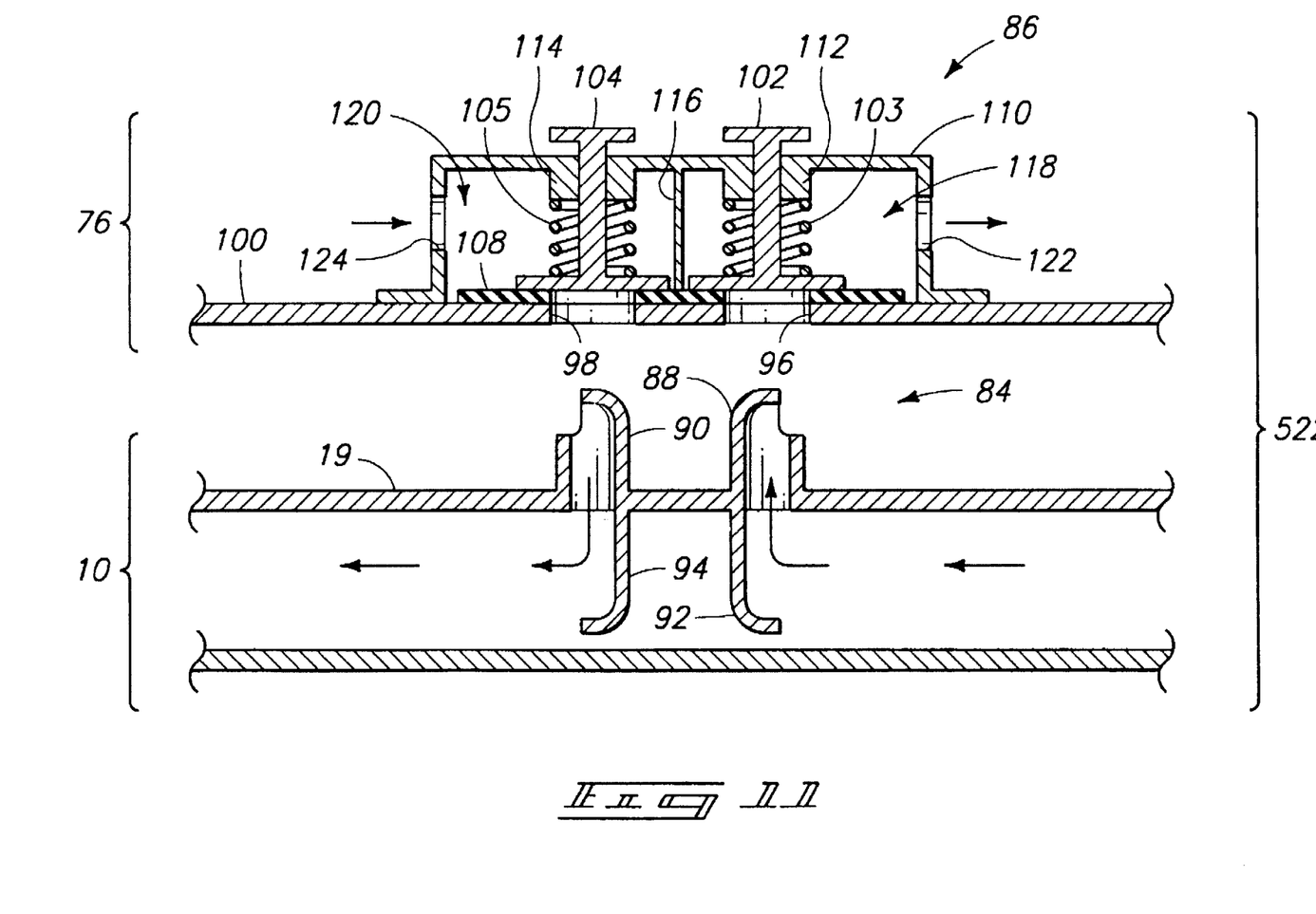
FIG. 11 is a vertical sectional view of even another alternatively constructed cooler assembly taken in the same location as FIG. 4 and depicting a cooling fluid coupling assembly including coupling ports on the cradle and receiving ports on the computer.

FIG. 11 illustrates even another alternatively constructed cooler assembly which comprises a cooling fluid coupling assembly 552 formed from a fluid port assembly 84 formed in top surface 19 on cradle 10, and a fluid port receiving assembly 86 mounted to a bottom inner surface of a lower housing shell 86 on computer 76. When notebook computer 76 is inserted onto cradle 10, fluid port assembly 84 mates in fluid coupling engagement with fluid port receiving assembly 86. Accordingly, a fluid path inlet and outlet are provided for transferring a flow of cooling fluid through the interior of notebook computer 76. Such flow of cooling fluid cools associated electronic components contained in computer 76. According to one construction, fan 27 (of FIG. 2) produces the source of cooling fluid within cradle 10. According to another construction, the cooling fluid flow may be produced from any forced air source, including a vehicle HVAC (Heating, Ventilating and Air Conditioning) fan having appropriate duct work to blow chilled air directly into cradle 10.

Fluid port assembly 84 of FIG. 11 has a fluid inlet port 88 and a fluid outlet port 90 which are formed integrally on top face 19 of cradle 10. Preferably, ports 88 and 90 are formed from metal sections which are welded onto the top surface of face 19. Additionally, an inlet baffle 92 traps and directs cooling fluid inside cradle 10, being received from a source for direction into port 88. Likewise, an outlet baffle 94 directs flow of outlet fluid from outlet port 90. Preferably, baffles 92 and 94 extend substantially across the entire cross-section on the inside of case 10. Alternatively, baffles 92 and 94 can be sized and configured to entrap a substantial portion of cooling fluid moving through cradle 10 so as to impart a desired flow of cooling fluid through notebook computer 76 when coupled in engagement with fluid port receiving assembly 86.

Fluid port receiving assembly 86 of FIG. 11 has an inlet receiving port 96 and an outlet receiving port 98 that extend through a bottom shell 100 of notebook computer 76. When computer 76 is not mated to cradle 10, a pair of spring-loaded plungers 102 and 104 seal each port 96 and 98, respectively, closed via cooperation of a sealing gasket 108 formed of resilient elastomeric material. Coil springs 103 and 105 are mounted in compression to bias plungers 102 and 104, respectively, into sealing engagement with gasket 108, during a normal unloaded state. An internal support housing 110 supports plungers 102 and 104 within axially slidable sleeve sections 112 and 114, respectively. Bracket 110 is preferably sealed to the inner surface of housing shell 100 around its periphery so that it can direct a flow of inlet and outlet air through the inside of notebook computer 76. Preferably, support housing 110 is formed from a piece of magnesium material which is welded to shell 100 about its periphery. Alternatively, housing 110 can be secured to shell 100 via a plurality of fasteners and adhesive sealing material.

Support housing 110 of FIG. 11 includes a center baffle wall 116 which subdivides the interior cavity into two chambers 118 and 120 that communicate individually with ports 96 and 98, respectively. Baffle 116 prevents a cross-flow of cooling air being received into inlet chamber 118 from mixing with air in outlet chamber 120. An inlet flow aperture 122 in housing 110 lets cooling air into the interior of computer 76. Similarly, an outlet flow aperture 124 lets cooling air out of the interior of computer 76 where it escapes via port 98.

According to the construction of FIG. 11, mating of computer 76 atop cradle 10 results in the insertion of ports 88 and 90 through receiving ports 96 and 98, respectively. More particularly, insertion of ports 88 and 90 causes the spring-biased opening of receiving ports 96 and 98, respectively, by engaging and displacing plungers 102 and 104, respectively, to open positions. Opening of plungers 102 and 104 causes further compression of associated springs 103 and 105. In this manner, cooling air is received into computer 76 via port 88 and it is removed via port 90. Such construction for cooler assembly 522 provides a heat transfer device that in a preferred implementation rejects heat from the interior of notebook computer 76. In this manner, cooler assembly 522 forms a heat rejector in the form of a fluid cooler that removes heat from the electronic components of notebook computer 76 by passing cooling fluid therethrough.

Alternatively, the heat transfer device of this invention can be used to introduce heat within the interior of notebook computer 76 according to the same construction wherein a source of heating fluid is introduced through port 88 and is removed through port 90 in order to heat the interior of notebook computer 76 and warm associated components therein. For example, a battery compartment of notebook computer 76 could be heated in order to enhance the operation of the battery when in use in harsh, cold environments.

Figure 12:
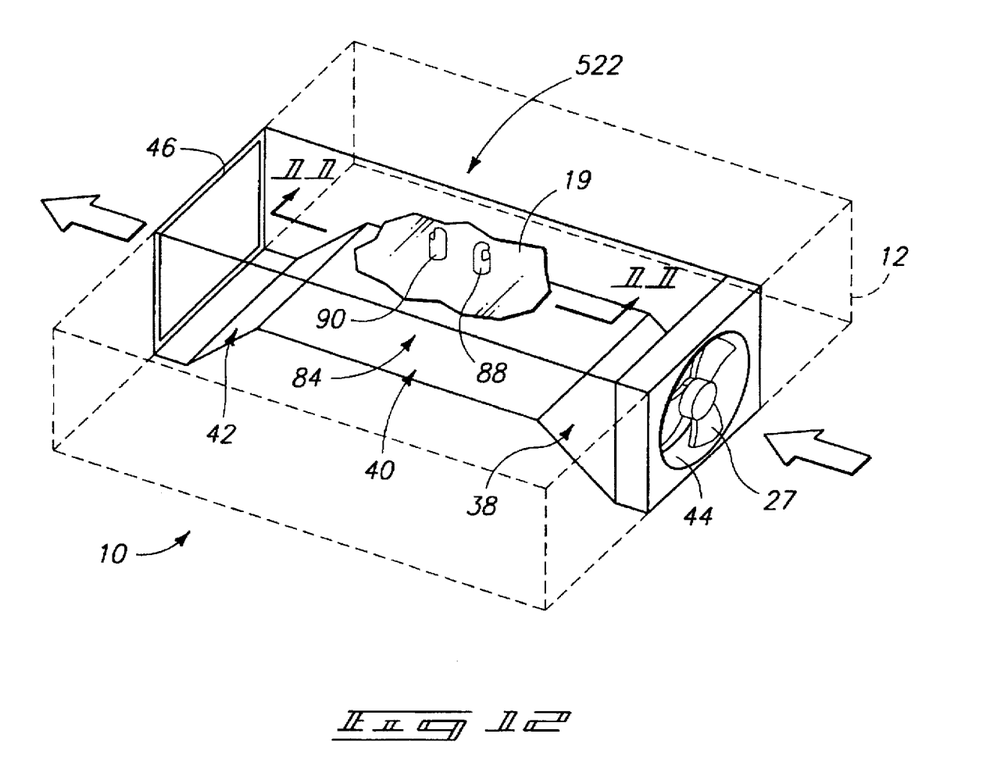
FIG. 12 is a perspective view of the cooler assembly provided in the cradle assembly of FIG. 1, but having the alternatively constructed cooler assembly of FIG. 11 with a fluid port assembly and illustrating the cradle housing in phantom to facilitate viewing.

FIG. 12 depicts the layout of surface assembly 84 on top surface 19 of base 12 of the cradle assembly 10. Inlet ports 88 and 90 are shown extending vertically upwardly of surface 19 for presentation and mating with a portable electronic device that is being received atop cradle 10. Fan 27 draws cooling (or heating) fluid into inlet port 44, inlet duct 38, throat duct 40, and outlet duct 42 where it exhausts through outlet port 46. Accordingly, a source of cooling air driven via fan 27 from outside cradle 10 provides direct cooling of the interior of a portable electronic device by ducting cooling fluid flow through the device. Additionally, surface 19 is cooled by the flow of cooling fluid through throat duct 40, which further contributes to cooling of the bottom of the portable electronic device when mated atop cradle 10.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An improved cradle assembly, comprising:
   a base having a mounting surface configured to removably receive a portable electronic device; and
   a cooler supported by the base and positioned in thermally conductive relation with a portable electronic device that is received on the mounting surface, the cooler being operable to dissipate heat from the portable electronic device.

2. The cradle assembly of claim 1 wherein the cooler comprises a thermoelectric cooler.

3. The cradle assembly of claim 2 further comprising a fan provided within the base, the fan being configured to cool a warm side of the thermoelectric cooler.

4. The cradle assembly of claim 2 wherein the thermoelectric cooler is positioned in proximate thermally conductive relation with a heat sink pipe of a portable electronic device being received on the cradle.

5. The cradle of assembly of claim 1 wherein the cradle assembly comprises a computer docking station.

6. The cradle assembly of claim 1 wherein the thermal cooler is in direct physical contact with the portable electronic device.

7. The cradle assembly of claim 1 further comprising a resilient thermally conductive pad interposed between the thermal cooler and the portable electronic device.

8. The cradle assembly of claim 7 wherein the thermally conductive pad comprises a thermally conductive, conformable, dielectric elastomeric material.

9. The cradle assembly of claim 1 further comprising a sensor carried by the base and configured to detect the presence of a portable electronic device being positioned in thermally conductive relation with the cooler.

10. The cradle assembly of claim 9 further comprising switching circuitry electrically coupled to the sensor and the cooler, and configured to activate the cooler in response to detection of a portable electronic device being positioned in thermally conductive relation with the cooler.

11. The cradle assembly of claim 1 further comprising a tray resiliently carried by the base and configured to support the cooler.

12. The cradle assembly of claim 1 further comprising a tray configured to support the cooler and at least one spring interposed between the tray and the base, the spring configured to engage the cooler in compliant and thermally conductive engagement with a bottom surface of a portable electronic device being received on the cradle.

13. The cradle assembly of claim 1 wherein the cooler comprises a cooler assembly having a fluid port assembly and a fluid port receiving assembly, one of the fluid port assembly and the fluid port receiving assembly being provided on the base, and the other of the fluid port assembly and the fluid port receiving assembly being provided on the portable electronic device, the portable electronic device being received onto the base such that the fluid port assembly engages in fluid communication with the fluid port receiving assembly to provide an inlet flow of cooling fluid and an outlet flow of cooling fluid from the base to an interior of the portable electronic device.

14. An improved cradle assembly, comprising:
   a base having a mounting surface configured to removably receive a portable electronic device; and
   a heat rejector supported by the base in thermally conductive relation with the portable electronic device when received on the mounting surface, the heat rejector being operable to dissipate heat from the portable electronic device.

15. The cradle assembly of claim 14 wherein the heat rejector comprises a thermal cooler carried in thermally conductive relation with the portable electronic device.

16. The cradle assembly of claim 15 further comprising a fan carried by the base, the fan being configured to reject heat from a warm side of the cooler.

17. The cradle assembly of claim 14 wherein the heat rejector comprises a fan carried by the base, the fan being configured to reject heat from a portable electronic device being carried by the cradle.

18. The cradle assembly of claim 14 wherein the heat rejector comprises a thermoelectric cooler, the thermoelectric cooler being positioned in proximate relation with a heat sink pipe of a portable electronic device being received on the cradle.

19. The cradle assembly of claim 14 wherein the heat rejector is in direct physical contact with the portable electronic device.

20. The cradle assembly of claim 14 further comprising a resilient thermally conductive pad interposed between the heat rejector and the portable electronic device.

21. The cradle assembly of claim 14 further comprising a sensor carried by the base and configured to detect the presence of a portable electronic device being positioned in thermally conductive relation with the heat rejector.

22. The cradle assembly of claim 21 further comprising switching circuitry electrically coupled to the sensor and the heat rejector, and configured to activate the heat rejector in response to detection of a portable electronic device being in thermally conductive relation with the heat rejector.

23. The cradle assembly of claim 14 wherein the heat rejector comprises a thermoelectric cooler, and the cradle assembly further comprises a tray configured to support the cooler, and at least one spring being interposed between the tray and the base, the spring being configured to engage the cooler in compliant and thermally conductive engagement with a bottom surface of a portable electronic device being received on the cradle.

24. An improved cradle assembly, comprising:
   a base having a mounting surface configured to removably receive a portable electronic device;
   a thermoelectric cooler supported by the base in thermally conductive relation with the portable electronic device when received on the mounting surface, the thermoelectric cooler in operation having a warm side and a cool side, the thermoelectric cooler being operable to dissipate heat from the portable electronic device; and
   a fluid cooler carried by the base in proximate relation to the warm side of the thermoelectric cooler, the fluid cooler being configured to reject heat from the warm side of the thermoelectric cooler.

25. The cradle assembly of claim 24 further comprising a switch carried by the cradle assembly, the switch being configured to detect mating of a portable electronic device on the cradle, the cradle being operable to enable operation of the thermoelectric cooler.

26. A computer docking station, comprising:
   a cradle configured to receive a computer;
   a heat transfer device carried by the cradle and configured in thermally conductive relation with a heat conducting portion of the computer when received on the cradle, the heat transfer device being operable to transfer heat between the computer and the heat transfer device.

27. The computer docking station of claim 26 wherein the heat transfer device comprises a cooler.

28. The computer docking station of claim 26 wherein the heat transfer device comprises a heat generator.

29. The computer docking station of claim 26 wherein the heat transfer device comprises a cooler assembly having a fluid port assembly and a fluid port receiving assembly, one of the fluid port assembly and the fluid port receiving assembly being provided on the base, and the other of the fluid port assembly and the fluid port receiving assembly being provided on the computer, the computer being received onto the base such that the fluid port assembly engages in fluid communication in thermally conductive relation via the cooling fluid with the fluid port receiving assembly to provide an inlet flow of cooling fluid and an outlet flow of cooling fluid from the base to an interior of the computer.

* * * * *

UNITED STATES PATENT AND TRADEMARK OFFICE
CERTIFICATE OF CORRECTION

PATENT NO. : 5,704,212                                      Page 1 of 2
DATED     : January 6, 1998
INVENTOR(S) : William F. Erler, et al It is certified that error appears in the above-indentified patent and that said Letters Patent is hereby corrected as shown below:

Column 4, line 34, delete the comma (,) after "application".

Column 5, line 37, delete the period after --C,-- (the abbreviation for Celsius).

Column 5, line 40, delete the period after --131° C-- (the abbreviation for Celsius).

Column 7, line 47, delete "spring 66" and insert --spring 64--.

Column 7, line 54, delete "Peltlet" and insert --Peltier--.

Column 8, line 5, delete "gage" and insert --gauge--.

Column 9, line 22, delete "computer 78" and insert --computer 76--.

Column 9, line 25, delete "computer 78" and insert --computer 76--.

UNITED STATES PATENT AND TRADEMARK OFFICE
CERTIFICATE OF CORRECTION

PATENT NO. : 5,704,212

DATED : January 6, 1998

INVENTOR(S) : William F. Erler, et al

It is certified that error appears in the above-indentified patent and that said Letters Patent is hereby corrected as shown below:

Column 11, line 16, delete "surface assembly 84" and insert --fluid port assembly 84--.

Signed and Sealed this

Eighteenth Day of August, 1998

Attest:

BRUCE LEHMAN

Attesting Officer     Commissioner of Patents and Trademarks